US012798912B2

(12) United States Patent
Eguchi et al.

(10) Patent No.: US 12,798,912 B2
(45) Date of Patent: Nov. 17, 2026

(54) MEDIUM TRANSPORT DEVICE AND IMAGE FORMING APPARATUS

(71) Applicant: FUJIFILM Business Innovation Corp., Tokyo (JP)

(72) Inventors: Hirotake Eguchi, Kanagawa (JP); Yasunobu Goto, Kanagawa (JP); Yoshinori Koike, Kanagawa (JP); Yuki Kawazoe, Kanagawa (JP); Shuhei Kobori, Kanagawa (JP); Kiyoshi Watanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 533 days.

(21) Appl. No.: 18/190,051

(22) Filed: Mar. 24, 2023

(65) Prior Publication Data

US 2024/0101372 A1 Mar. 28, 2024

(30) Foreign Application Priority Data

Sep. 27, 2022 (JP) ................................ 2022-154030

(51) Int. Cl.

| | |
|---|---|
| ***B65H 9/00*** | (2006.01) |
| ***B65H 5/02*** | (2006.01) |
| ***B65H 5/06*** | (2006.01) |
| ***B65H 9/10*** | (2006.01) |
| ***B65H 9/16*** | (2006.01) |
| *G03G 15/00* | (2006.01) |

(52) U.S. Cl.

CPC ............. *B65H 5/025* (2013.01); *B65H 5/023* (2013.01); *B65H 5/062* (2013.01); *B65H 9/002* (2013.01); *B65H 9/103* (2013.01); *B65H 9/166* (2013.01); *B65H 2801/06* (2013.01); *G03G 15/6561* (2013.01); *G03G 15/6567* (2013.01); *G03G 2215/00721* (2013.01)

(58) Field of Classification Search

CPC ........ B65H 5/025; B65H 5/023; B65H 5/062; B65H 9/002; B65H 9/103; B65H 9/166; B65H 2801/06; G03G 15/6561; G03G 15/6567; G03G 2215/00721

See application file for complete search history.

(56) References Cited

U.S. PATENT DOCUMENTS

2017/0097604 A1* 4/2017 Nakamura ............... B65H 7/02

FOREIGN PATENT DOCUMENTS

| | | | |
|---|---|---|---|
| EP | 2169531 | * | 3/2010 |
| JP | 2017105625 | | 6/2017 |

* cited by examiner

*Primary Examiner* — Thomas A Morrison
(74) *Attorney, Agent, or Firm* — JCIPRNET

(57) ABSTRACT

A medium transport device includes a first transporter configured to transport a medium by nipping the medium along with rotation, a second transporter configured to transport the medium and disposed on an upstream side of the first transporter in a transport direction of the medium, a first adjuster configured to adjust a position of the medium in a width direction by moving the first transporter and the second transporter in the width direction of the medium with the medium nipped by the first transporter and the second transporter, and a second adjuster configured to adjust a contact pressure of the first transporter for the medium and a contact pressure of the second transporter for the medium based on resistance caused when the medium is moved in the width direction.

18 Claims, 11 Drawing Sheets

MEDIUM TRANSPORT DEVICE AND IMAGE FORMING APPARATUS

CROSS-REFERENCE TO RELATED APPLICATIONS

This application is based on and claims priority under 35 USC 119 from Japanese Patent Application No. 2022-154030 filed Sep. 27, 2022.

BACKGROUND

(i) Technical Field

The present disclosure relates to a medium transport device and an image forming apparatus.

(ii) Related Art

Japanese Unexamined Patent Application Publication No. 2017-105625 ("0026"-"0081" (in particular, "0038"-"0040" and "0052"-"0054"), FIGS. 4 to 7) describes the following technology in a medium transport device that transports a medium before or after image printing.

Japanese Unexamined Patent Application Publication No. 2017-105625 describes a technology in which a pair of registration rollers (200), a pair of loop rollers (240), and a pair of ADU transport rollers (300) are synchronized to rock in a roller axis direction with paper (P) nipped between the three pairs of rollers, thereby adjusting the axial position of the paper while suppressing a paper crook even in a case of large-size paper or thick paper. In the technology described in Japanese Unexamined Patent Application Publication No. 2017-105625, the transport pressures (nip pressures) of the three pairs of rollers are set to increase as the thickness of the paper (P) increases. If the distance from the registration rollers (200) at the downstream end is short, the transport pressures of the pairs of rollers (240, 300) on the upstream side are reduced to prolong their lives and suppress creasing during the rocking motion.

SUMMARY

Aspects of non-limiting embodiments of the present disclosure relate to accurate positional adjustment of a medium in a width direction compared with a case where the medium is nipped at a fixed pressure when adjusting the position of the medium by moving the medium in the width direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a medium transport device comprising: a first transporter configured to transport a medium by nipping the medium along with rotation; a second transporter configured to transport the medium and disposed on an upstream side of the first transporter in a transport direction of the medium; a first adjuster configured to adjust a position of the medium in a width direction by moving the first transporter and the second transporter in the width direction of the medium with the medium nipped by the first transporter and the second transporter; and a second adjuster configured to adjust a contact pressure of the first transporter for the medium and a contact pressure of the second transporter for the medium based on resistance caused when the medium is moved in the width direction.

BRIEF DESCRIPTION OF THE DRAWINGS

An exemplary embodiment of the present disclosure will be described in detail based on the following figures, wherein.

DETAILED DESCRIPTION

Figure 1:
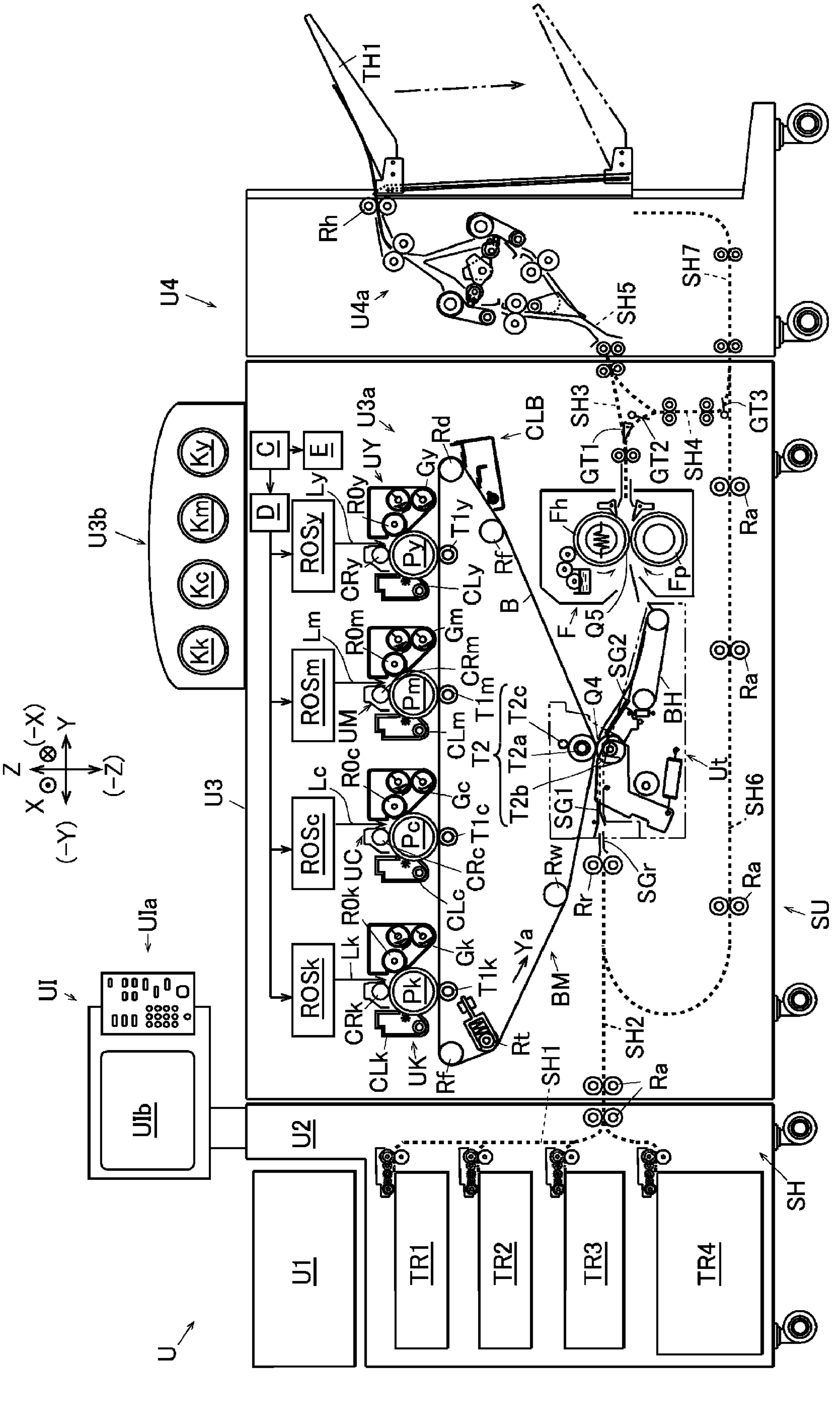
FIG. 1 illustrates an overall image forming apparatus of a first exemplary embodiment.

An exemplary embodiment of the present disclosure is described with reference to the drawings. The exemplary embodiment of the present disclosure is not limited to the following exemplary embodiment.

To facilitate understanding of the following description, the drawings illustrate a fore-and-aft direction as an X-axis direction, a lateral direction as a Y-axis direction, and a vertical direction as a Z-axis direction. In the drawings, directions or sides indicated by arrows X, −X, Y, −Y, Z, and −Z are defined as "forward", "rearward", "rightward", "leftward", "upward", and "downward", or "front side", "rear side", "right side", "left side", "upper side", and "lower side", respectively.

In the drawings, a symbol represented by a dot in a circle means an arrow from back to front on the drawing sheet, and a symbol represented by a letter "x" in a circle means an arrow from front to back on the drawing sheet.

In the following description with reference to the drawings, illustrations other than members necessary to facilitate understanding are omitted as appropriate.

First Exemplary Embodiment

FIG. 1 illustrates an overall image forming apparatus of a first exemplary embodiment.

Figure 2:
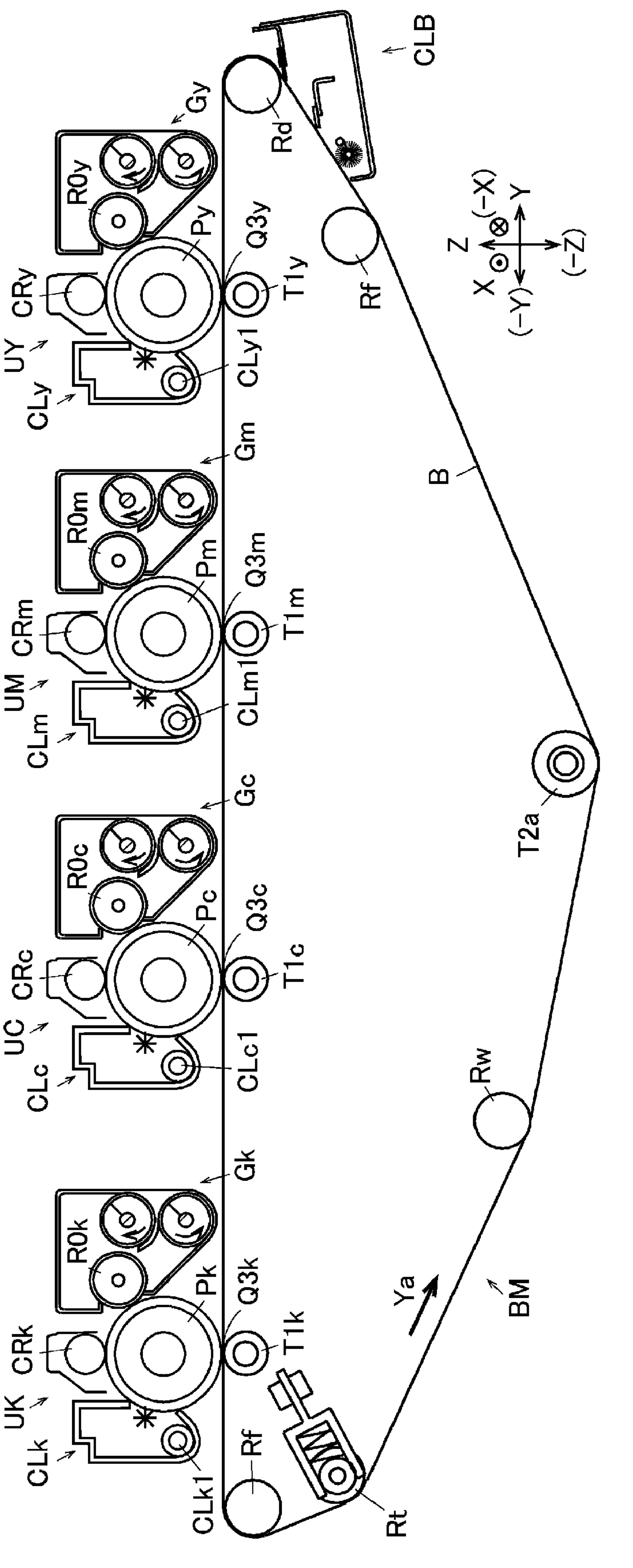
FIG. 2 is an enlarged view of a visible image forming device of the first exemplary embodiment.

FIG. 2 is an enlarged view of a visible image forming device of the first exemplary embodiment.

In FIG. 1, a copying machine U that is an example of the image forming apparatus includes a user interface UI that is an example of an operator, a scanner U1 that is an example of an image reading device, a feeder U2 that is an example of a medium feeding device, an image forming unit U3 that is an example of an image recording device, and a medium processing device U4.

(User Interface UI)

The user interface UI includes input buttons Ula to be used for starting copying and setting the number of copies. The user interface UI further includes a display UIb that displays information input by using the input buttons Ula and the status of the copying machine U.

(Feeder U2)

In FIG. 1, the feeder U2 includes a plurality of paper feed trays TR1, TR2, TR3, and TR4 that are examples of a medium container. The feeder U2 further includes a medium feed path SH1 along which recording paper S that is an example of an image recording medium is picked out from any one of the paper feed trays TR1 to TR4 and transported to the image forming unit U3.

(Image Forming Unit U3 and Medium Processing Device U4)

In FIG. 1, the image forming unit U3 includes an image recorder U3*a* that records an image on the recording paper S transported from the feeder U2 based on a document image read by the scanner U1.

In FIG. 1 and FIG. 2, a latent image forming device driving circuit D of the image forming unit U3 outputs, based on image information input from the scanner U1, driving signals to yellow (Y), magenta (M), cyan (C), and black (K) latent image forming devices ROSy, ROSm, ROSc, and ROSk at preset timings. Photoconductor drums Py, Pm, Pc, and Pk that are examples of an image carrier are disposed below the latent image forming devices ROSy to ROSk that are examples of a writer, respectively.

The surfaces of the rotating photoconductor drums Py to Pk are uniformly charged by charging rollers CRy, CRm, CRc, and CRk that are examples of a charger, respectively. Electrostatic latent images are formed on the charged surfaces of the photoconductor drums Py to Pk by laser beams Ly, Lm, Lc, and Lk that are examples of latent image writing light and output from the latent image forming devices ROSy to ROSk, respectively. The electrostatic latent images are developed into yellow, magenta, cyan, and black toner images that are examples of a visible image by developing devices Gy, Gm, Gc, and Gk that are examples of a developing unit, respectively.

In the developing devices Gy to Gk, developers consumed by development are supplied from toner cartridges Ky, Km, Kc, and Kk that are examples of a developer container, respectively. The toner cartridges Ky to Kk are removably mounted on a developer supply device U3*b*.

The toner images on the surfaces of the photoconductor drums Py to Pk are sequentially transferred and laid over one another in first transfer areas Q3*y*, Q3*m*, Q3*c*, and Q3*k* on an intermediate transfer belt B that is an example of an intermediate transferrer by first transfer rollers T1*y*, T1*m*, T1*c*, and T1*k* that are examples of a first transferrer, respectively. Thus, a color toner image that is an example of a multicolor visible image is formed on the intermediate transfer belt B. The color toner image is transported to a second transfer area Q4.

In a case of black image information alone, the black photoconductor drum Pk and the black developing device Gk are used to form a black toner image.

On the photoconductor drums Py to Pk after the first transfer, drum cleaners CLy, CLm, CLc, and CLk that are examples of an image carrier cleaner remove residues such as residual developers or paper dust on the surfaces, respectively.

In the first exemplary embodiment, the photoconductor drum Pk, the charging roller CRk, and the drum cleaner CLk are integrated into a black photoconductor unit UK that is an example of an image carrier unit. In the other colors (yellow, magenta, and cyan) as well, the photoconductor drums Py, Pm, and Pc, the charging rollers CRy, CRm, and CRc, and the drum cleaners CLy, CLm, and CLc constitute photoconductor units UY, UM, and UC, respectively.

The black photoconductor unit UK and the developing device Gk including a developing roller ROk that is an example of a developer carrier constitute a black image former UK+Gk. Similarly, the yellow, magenta, and cyan photoconductor units UY, UM, and UC and the developing devices Gy, Gm, and Gc including developing rollers ROy, ROm, and ROc constitute yellow, magenta, and cyan image formers UY+Gy, UM+Gm, and UC+Gc, respectively.

A belt module BM that is an example of the intermediate transferrer is disposed below the photoconductor drums Py to Pk. The belt module BM includes the intermediate transfer belt B that is an example of the image carrier, a driving roller Rd that is an example of an intermediate transferrer driver, a tension roller Rt that is an example of a tensile force applier, a walking roller Rw that is an example of a meandering preventer, a plurality of idler rollers Rf that are examples of a driven component, a backup roller T2*a* that is an example of a facing component, and the first transfer rollers T1*y* to T1*k*. The intermediate transfer belt B is supported while being rotatable in an arrow Ya direction.

In the first exemplary embodiment, the yellow, magenta, and cyan first transfer rollers T1*y*, T1*m*, and T1*c* are supported while being approachable to or separable from the photoconductor drums Py, Pm, and Pc, respectively. In multicolor printing, the yellow, magenta, and cyan first transfer rollers T1*y*, T1*m*, and T1*c* approach the photoconductor drums Py to Pc, respectively, to nip the intermediate transfer belt B at a predetermined contact pressure. In monochrome printing using black alone, the first transfer rollers T1*y*, T1*m*, and T1*c* are separated from the photoconductor drums Py to Pc, respectively.

A second transfer unit Ut is disposed below the backup roller T2*a*. The second transfer unit Ut includes a second transfer roller T2*b* that is an example of a second transferrer. The second transfer area Q4 is an area where the second transfer roller T2*b* is in contact with the intermediate transfer belt B. The backup roller T2*a* faces the second transfer roller T2*b* across the intermediate transfer belt B. A contact roller T2*c* that is an example of a power supplier is in contact with the backup roller T2*a*. A second transfer voltage having the same polarity as a toner charging polarity is applied to the contact roller T2*c*.

The backup roller T2*a*, the second transfer roller T2*b*, and the contact roller T2*c* constitute a second transferrer T2.

The second transfer unit Ut of the first exemplary embodiment is approachable to or separable from the intermediate transfer belt B. Depending on the type of the recording paper S in use, the second transfer unit Ut moves to change the contact pressure between the second transfer roller T2*b* and the intermediate transfer belt B. For example, in a case of thick paper, the contact pressure is reduced compared with a case of plain paper to reduce an impact when the leading edge of the thick paper enters the second transfer area Q4.

A medium transport path SH2 is disposed below the belt module BM. The recording paper S fed through the medium feed path SH1 of the feeder U2 is transported to registration rollers Rr that are an example of a transport timing adjuster by transport rollers Ra that are an example of a medium transporter. The registration rollers Rr transport the recording paper S downstream in synchronization with a timing when the toner image formed on the intermediate transfer belt B is transported to the second transfer area Q4. The recording paper S sent out by the registration rollers Rr is guided by a registration paper guide SGr and a pre-transfer paper guide SG1 and transported to the second transfer area Q4.

The toner image on the intermediate transfer belt B is transferred onto the recording paper S by the second transferrer T2 when passing through the second transfer area Q4. In the case of a color toner image, the toner images firstly transferred onto the surface of the intermediate transfer belt B and laid over one another are secondly transferred collectively onto the recording paper S.

The first transfer rollers T1*y* to T1*k*, the second transferrer T2, and the intermediate transfer belt B constitute a transfer device (transferrer) T1*y*–T1*k*+T2+B of the first exemplary embodiment.

The intermediate transfer belt B after the second transfer is cleaned by a belt cleaner CLB that is an example of an intermediate transferrer cleaner disposed on a downstream side of the second transfer area Q4. The belt cleaner CLB removes, from the intermediate transfer belt B, residues such as paper dust or developers that remain without being transferred in the second transfer area Q4.

The recording paper S onto which the toner image is transferred is guided by a post-transfer paper guide SG2 and sent to a belt transport device BH that is an example of the medium transporter. The belt transport device BH transports the recording paper S to a fixing device F.

The fixing device F includes a heating roller Fh that is an example of a heater, and a pressure roller Fp that is an example of a pressurizer. The recording paper S is transported to a fixing area Q5 where the heating roller Fh is in contact with the pressure roller Fp. The toner image on the recording paper S is fixed by being heated and pressurized by the fixing device F when passing through the fixing area Q5.

The image formers UY+Gy to UK+Gk, the transfer device T1*y*–T1*k*+T2+B, and the fixing device F constitute the image recorder U3*a* that is an example of an image former of the first exemplary embodiment.

A switching gate GT1 that is an example of a switcher is provided on a downstream side of the fixing device F. The switching gate GT1 selectively switches the recording paper S having passed through the fixing area Q5 into an output path SH3 toward the medium processing device U4 or into a reversing path SH4. The recording paper S transported to the output path SH3 is transported to a paper transport path SH5 of the medium processing device U4. A curl correction member U4*a* that is an example of a warp corrector is disposed on the paper transport path SH5. The curl correction member U4*a* corrects a warp, that is, a curl of the transported recording paper S. The recording paper S having undergone the curl correction is output, with its image-fixed side oriented upward, to an output tray TH1 that is an example of a medium outputter by output rollers Rh that are an example of a medium output member.

The recording paper S transported toward the reversing path SH4 of the image forming unit U3 by the switching gate GT1 is transported to the reversing path SH4 through a second gate GT2 that is an example of the switcher.

To output the recording paper S with its image-fixed side oriented downward, the transport direction of the recording paper S is reversed after the trailing edge of the recording paper S in the transport direction has passed through the second gate GT2. The second gate GT2 of the first exemplary embodiment is a thin-film elastic member. The second gate GT2 causes the recording paper S to temporarily pass when it is transported toward the reversing path SH4, and guides the recording paper S toward the transport paths SH3 and SH5 when the recording paper S is reversed, that is, switched back. The switched-back recording paper S is output to the output tray TH1 through the curl correction member U4*a* with its image-fixed side oriented downward.

A circulation path SH6 is connected to the reversing path SH4 of the image forming unit U3. A third gate GT3 that is an example of the switcher is disposed at the connecting portion. The downstream end of the reversing path SH4 is connected to a reversing path SH7 of the medium processing device U4.

The recording paper S transported to the reversing path SH4 through the switching gate GT1 is transported toward the reversing path SH7 of the medium processing device U4 by the third gate GT3. The third gate GT3 of the first exemplary embodiment is a thin-film elastic member similarly to the second gate GT2. The third gate GT3 causes the recording paper S to temporarily pass when it is transported along the reversing path SH4, and guides the recording paper S toward the circulation path SH6 when the recording paper S is switched back.

The recording paper S transported to the circulation path SH6 is sent again to the second transfer area Q4 through the medium transport path SH2, and printing is performed on the second side.

The elements SH1 to SH7 constitute a paper transport path SH. The elements SH, Ra, Rr, Rh, SGr, SG1, SG2, BH, and GT1 to GT3 constitute a paper transport device SU of the first exemplary embodiment.

(Medium Transport Device)

Figure 3:
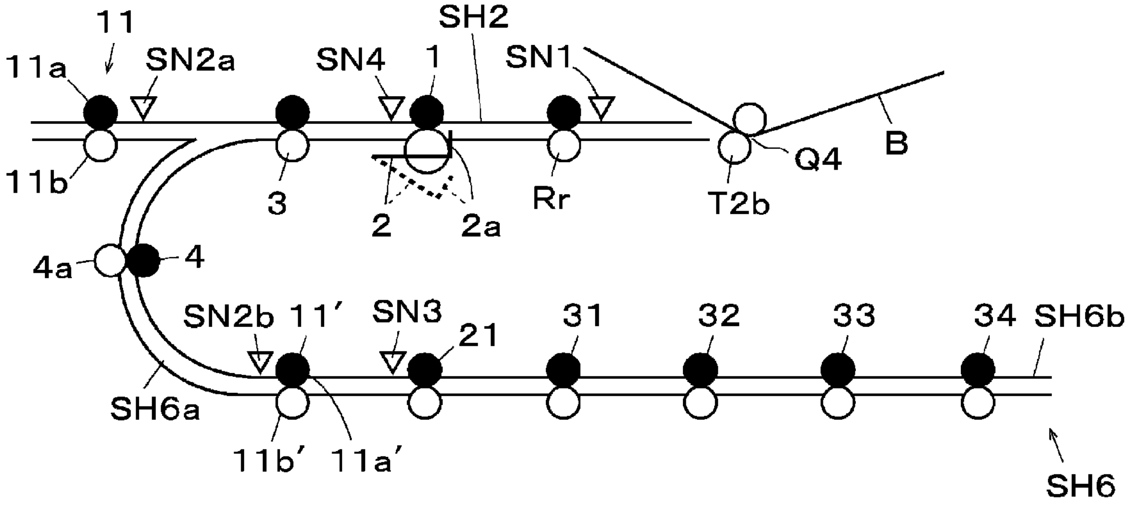
FIG. 3 illustrates a medium transport device of the first exemplary embodiment.

FIG. 3 illustrates a medium transport device of the first exemplary embodiment.

In FIG. 3, the registration rollers Rr of the first exemplary embodiment rotate in response to driving transmission from a motor (not illustrated) to send the recording paper S toward the second transfer area Q4, and are movable along an axial direction of each rotation shaft. Thus, the registration rollers Rr of the first exemplary embodiment function as downstream side correction rollers that are an example of a first transporter, in addition to the function of adjusting the timing to send the recording paper S toward the second transfer area Q4.

First transport rollers 1 that are an example of a transporter are disposed on an upstream side of the registration rollers Rr along the medium transport path SH2 that is an example of a first transport path. An abutment gate 2 that is an example of a first inclination corrector is disposed at a position of the first transport rollers 1. The abutment gate 2 is movable between an abutment position where an abutment portion 2*a* enters the medium transport path SH2 (see the solid line in FIG. 3) and a retraction position where the abutment portion 2*a* is retracted from the medium transport path SH2 (see the broken line in FIG. 3). At the abutment position of the abutment gate 2, the leading edge of the recording paper S abuts against the abutment gate 2 to correct an inclination, that is, a skew of the leading edge of the recording paper S.

In the medium transport path SH2, second transport rollers 3 that are an example of the transporter are disposed on an upstream side of the first transport rollers 1 in the transport direction.

Along the medium transport path SH2, first upstream side correction rollers 11 that are an example of a second transporter and a first-side transporter are disposed on an upstream side of the second transport rollers 3. In the first exemplary embodiment, the medium transport path SH2 from the registration rollers Rr to the first upstream side correction rollers 11 extends straight in the horizontal direction (in a planar or flat shape).

Similarly to the registration rollers Rr, the first upstream side correction rollers 11 of the first exemplary embodiment are movable along an axial direction of each rotation shaft. The first upstream side correction rollers 11 also function as the medium transporter to transport the recording paper S downstream while nipping the recording paper S between a driving roller 11*a* and a driven roller 11*b* that are an example of a medium transport member.

Figure 4A:
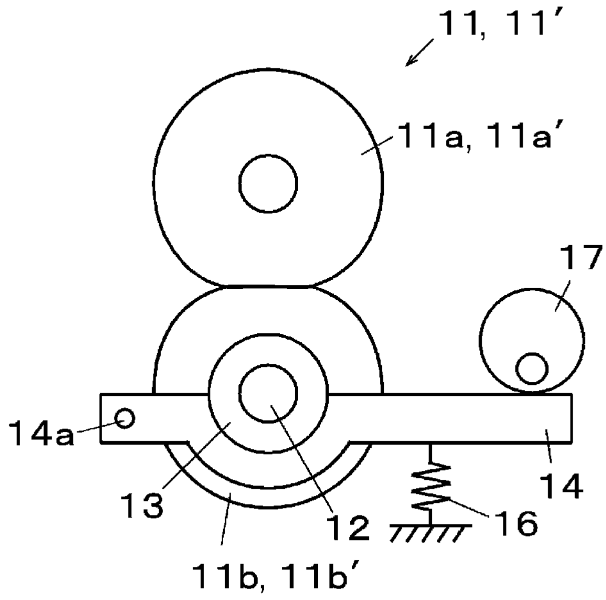
FIG. 4A illustrates a contact pressure adjustment mechanism for upstream side correction rollers of the first exemplary embodiment when the contact pressure is maximum.
Figure 4B:
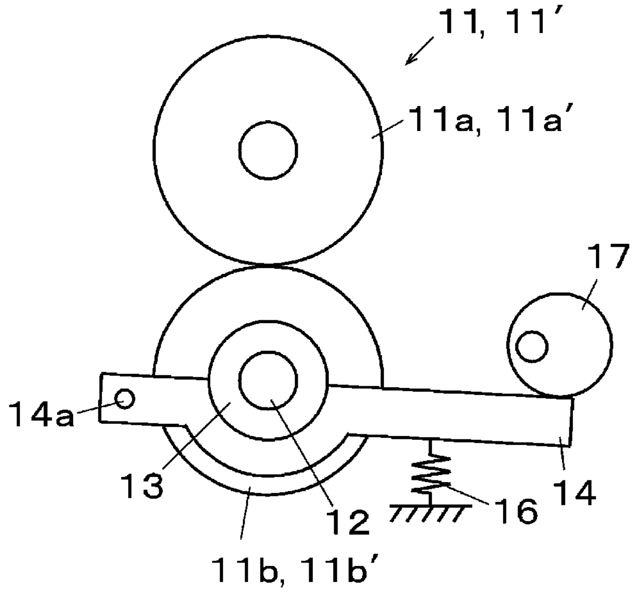
FIG. 4B illustrates the contact pressure adjustment mechanism when the contact pressure is low.
Figure 4C:
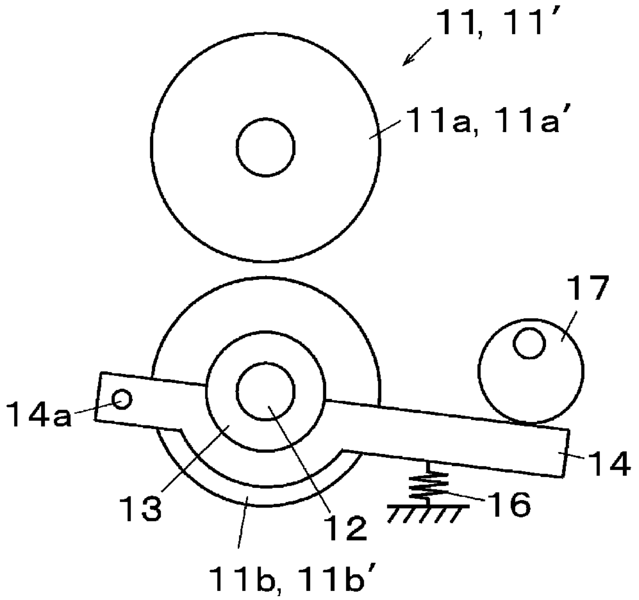
FIG. 4C illustrates the contact pressure adjustment mechanism when the upstream side correction rollers are at a non-nipping position.

FIG. 4A illustrates a contact pressure adjustment mechanism for the upstream side correction rollers of the first exemplary embodiment when the contact pressure is maximum. FIG. 4B illustrates the contact pressure adjustment mechanism when the contact pressure is low. FIG. 4C illustrates the contact pressure adjustment mechanism when the upstream side correction rollers are at a non-nipping position.

In FIGS. 4A to 4C, a bearing 13 for a rotation shaft 12 of the driven roller 11*b* in the first upstream side correction rollers 11 of the first exemplary embodiment is supported on an arm 14 that is an example of a movable component. One end of the arm 14 is supported on a frame (not illustrated) while being rotatable about a rotation shaft 14*a*. A spring 16 that is an example of a pusher is supported at the other end of the arm 14. The spring 16 applies a force for pushing the driven roller 11*b* toward the driving roller 11*a*. An eccentric cam 17 that is an example of an actuator is disposed at the other end of the arm 14. The eccentric cam 17 rotates in response to driving transmission from a motor (not illustrated) to move between a position where the distance between the axes of the driving roller 11*a* and the driven roller 11*b* is shortest as illustrated in FIG. 4A and a non-nipping position where the driving roller 11*a* and the driven roller 11*b* are separated from each other to cancel the nip of the recording paper S as illustrated in FIG. 4C.

Thus, the first upstream side correction rollers 11 are movable between a transport position where the recording paper S is nipped between the rollers 11*a* and 11*b* (position illustrated in FIG. 4A or 4B) and the non-nipping position where the nip of the recording paper S is canceled (position illustrated in FIG. 4C). As illustrated in FIG. 4A and FIG. 4B, the first upstream side correction rollers 11 may adjust the contact pressure between the driving roller 11*a* and the driven roller 11*b* in response to rotational position control on the eccentric cam 17.

Although illustration is omitted, the registration rollers Rr of the first exemplary embodiment may also adjust the contact pressure similarly to the first upstream side correction rollers 11.

In FIG. 3, a junction path SH6*a* of a circulation path SH6 that is an example of a second transport path is joined to the medium transport path SH2 at a position on an upstream side of the second transport rollers 3 and on a downstream side of the first upstream side correction rollers 11. The junction path SH6*a* is a downstream part of the circulation path SH6 in the transport direction.

The junction path SH6*a* of the first exemplary embodiment is curved into an arc from the bottom to the top. An upstream portion SH6*b* extending straight in the horizontal direction (in a planar or flat shape) is connected to an upstream side of the arcuate junction path SH6*a*.

Along the junction path SH6*a*, third transport rollers 4 that are an example of the transporter are disposed on an upstream side of the second transport rollers 3. In each of the first transport rollers 1, the second transport rollers 3, and the third transport rollers 4 of the first exemplary embodiment, the paired rollers facing each other across the recording paper S are movable between the non-nipping position where the rollers are separated from each other to cancel the nip of the recording paper S and the transport position where the rollers are in contact with each other to nip and transport the recording paper S. That is, the recording paper S is nipped by each of the transport rollers 1, 3, and 4 at the transport position, and is not nipped at the non-nipping position. In each of the transport rollers 1, 3, and 4 of the first exemplary embodiment, one of the paired rollers is a driving side and the other is a driven side. The driving roller does not move and the driven roller moves. In FIG. 3, the driving side is represented by a solid circle and the driven side is represented by a blank circle. In the first exemplary embodiment, the separable roller is disposed on a lower side in the gravity direction. That is, the recording paper S sagging by gravity comes into contact with the non-rotatable driven roller and an inappropriate transport force is not applied to the recording paper S.

In the circulation path SH6 of FIG. 3, second upstream side correction rollers 11' that are an example of a second-side transporter and the second transporter are disposed on an upstream side of the third transport rollers 4. The second upstream side correction rollers 11' are similar to the first upstream side correction rollers 11. Similarly to the registration rollers Rr and the first upstream side correction rollers 11, the second upstream side correction rollers 11' may transport the recording paper S, move along an axial direction of each rotation shaft, and adjust the contact pressure. Similarly to the first upstream side correction rollers 11, the second upstream side correction rollers 11' are movable between the transport position and the non-nipping position, that is, a driving roller 11*a'* and a driven roller 11*b'* may be brought into contact with or separated from each other.

The first upstream side correction rollers 11 and the second upstream side correction rollers 11' constitute upstream side correction rollers 11+11' that are an example of the second transporter.

Figure 5:
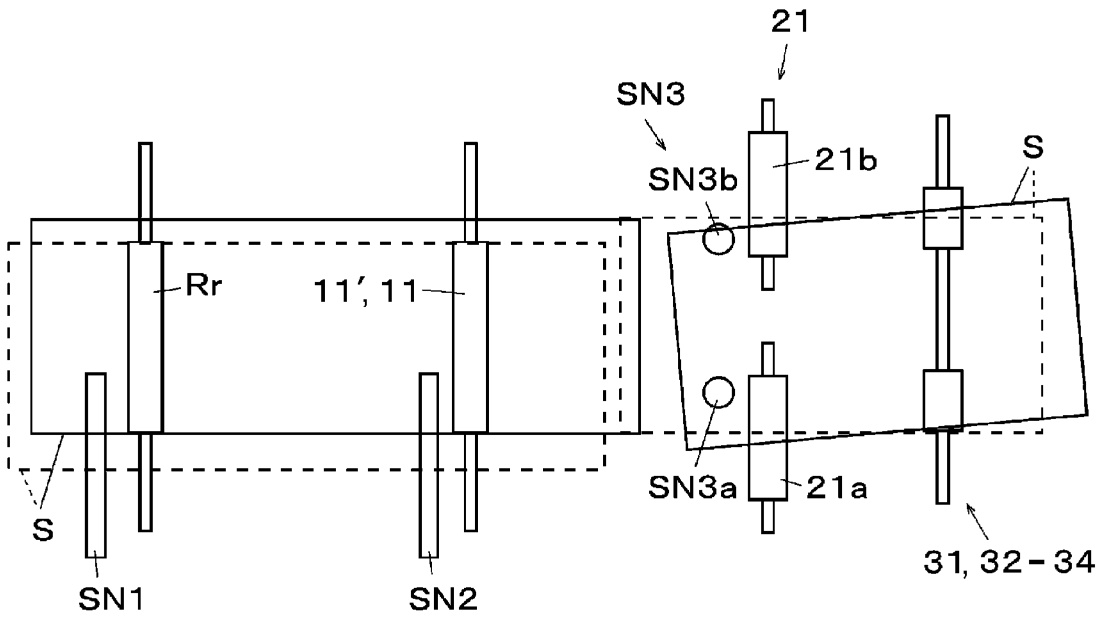
FIG. 5 illustrates a positional relationship between a positional corrector and an inclination corrector of the medium transport device of the first exemplary embodiment.

FIG. 5 illustrates a positional relationship between a positional corrector and an inclination corrector in the medium transport device of the first exemplary embodiment.

In FIG. 5, illustration is omitted for members not related to the positional corrector and the inclination corrector.

In FIG. 3 and FIG. 5, skew correction rollers 21 that are an example of a second inclination corrector are disposed in the upstream portion SH6*b* on an upstream side of the second upstream side correction rollers 11'.

In FIG. 5, the skew correction rollers 21 are disposed in pairs with a distance therebetween in an axial direction of each rotation shaft, that is, a width direction of the recording paper S. That is, the skew correction rollers 21 of the first exemplary embodiment include left rollers 21*a* that are an example of a first inclination correction member disposed on one side in the width direction, and right rollers 21*b* that are an example of a second inclination correction member disposed on the other side in the width direction. The left rollers 21*a* and the right rollers 21*b* of the first exemplary embodiment are independently controllable in terms of driving transmission from a motor, rotational speed, driving and stopping, and speed change timing.

In FIG. 3, the skew correction rollers 21 of the first exemplary embodiment are movable between the transport position and the non-nipping position similarly to the transport rollers 1, 3, and 4 and the upstream side correction rollers 11 and 11'. A plurality of transport rollers 31 to 34 that are examples of the medium transporter are disposed on an upstream side of the skew correction rollers 21. The transport rollers 31 to 34 are movable between the transport position and the non-nipping position similarly to the transport rollers 1, 3, and 4 and the like.

In the copying machine U of the first exemplary embodiment of FIG. 3 and FIG. 5, a downstream side detection sensor SN1 that is an example of a position detector is disposed on a downstream side of the registration rollers Rr on the medium transport path SH2. In FIG. 5, the downstream side detection sensor SN1 detects one edge, that is, one side of the recording paper S in the width direction. The downstream side detection sensor SN1 of the first exemplary embodiment is, but not limited to, a so-called line sensor including detectors arranged in line. Any known detector such as a contact image sensor (CIS) may be employed to detect the edge of the recording paper S.

A first upstream side detection sensor SN2*a* and a second upstream side detection sensor SN2*b* that are examples of the position detector are disposed on a downstream side of the first upstream side correction rollers 11 and on a downstream side of the second upstream side correction rollers 11', respectively. The first upstream side detection sensor SN2*a* and the second upstream side detection sensor SN2*b* constitute an upstream side detection sensor SN2 of the first exemplary embodiment. The upstream side detection sensor SN2 is similar to the downstream side detection sensor SN1 and is configured to detect one edge of the recording paper in the width direction.

In FIG. 3 and FIG. 5, skew detection sensors SN3 that are an example of an inclination detector are disposed on a downstream side of the skew correction rollers 21. In FIG. 5, the skew detection sensors SN3 include a left sensor SN3*a* associated with the left rollers 21*a*, and a right sensor SN3*b* associated with the right rollers 21*b*. The inclination, that is, the skew of the recording paper S in the transport direction may be derived based on the transport speeds of the skew correction rollers 21 and a time difference from detection of the leading edge of the recording paper S in the transport direction by one of the sensors SN3*a* and SN3*b* to detection of the leading edge by the other one of the sensors SN3*a* and SN3*b*.

A paper sensor SN4 that detects the presence or absence of the recording paper S is disposed near the first transport rollers 1.

The rollers Rr and 1 to 34 and the sensors SN1 to SN4 constitute the medium transport device of the first exemplary embodiment.

Controller of First Exemplary Embodiment

Figure 6:
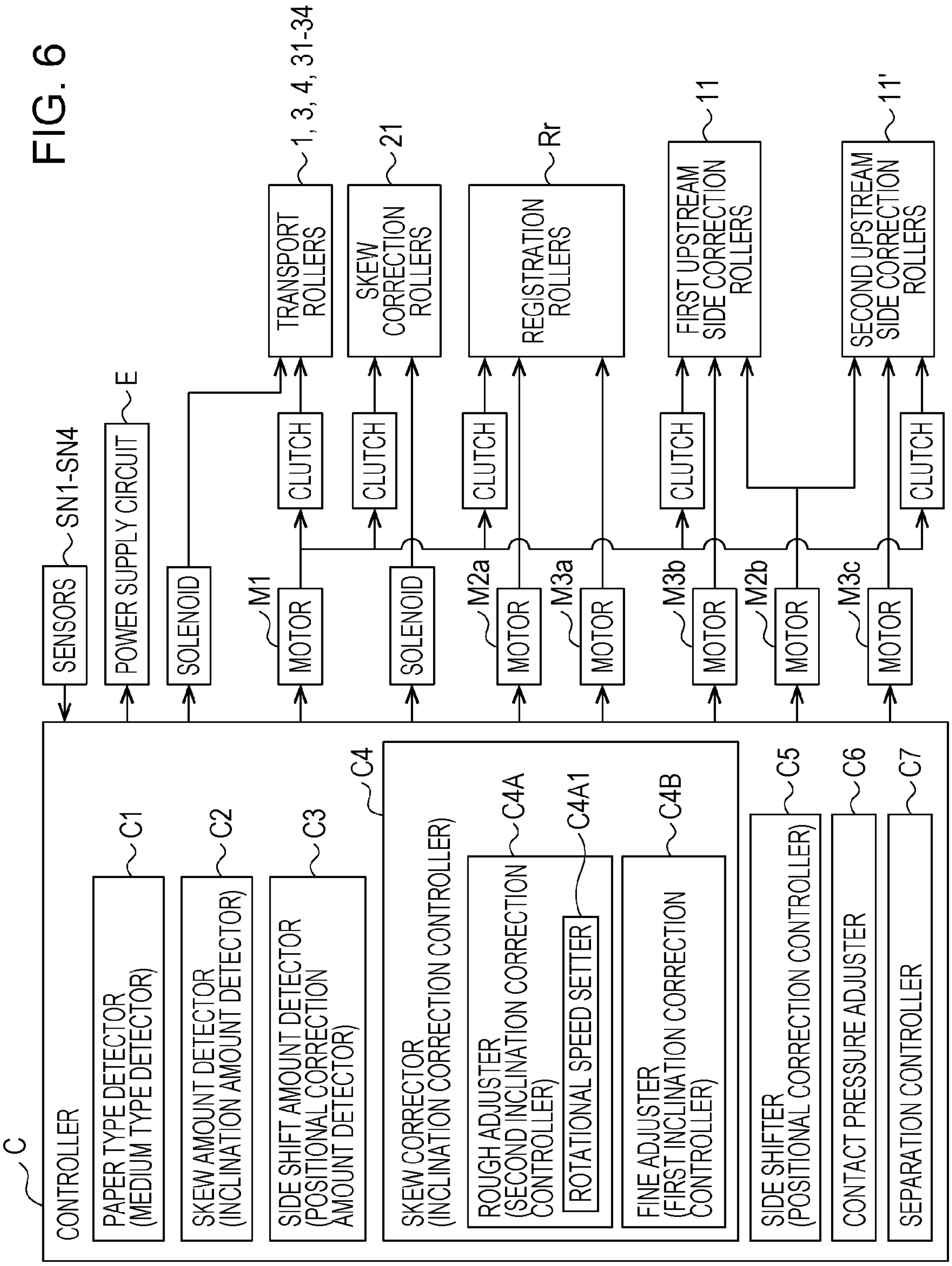
FIG. 6 illustrates a controller of the first exemplary embodiment.

FIG. 6 illustrates a controller of the first exemplary embodiment.

In FIG. 6, a controller C of the copying machine U includes an input/output interface I/O for inputting signals from and outputting signals to the outside. The controller C includes a read-only memory (ROM) that stores programs and information for processes. The controller C further includes a random-access memory (RAM) that temporarily stores data. The controller C further includes a central processing unit (CPU) that performs processes based on the programs stored in the ROM or the like. The controller C of the first exemplary embodiment is a small-size information processing device, that is, a microcomputer. The controller C may implement various functions by executing the programs stored in the ROM or the like.

The controller C of the first exemplary embodiment receives signals from signal output elements, and controls control target elements by outputting signals thereto.

(Signal Output Elements)

The controller C receives signals from the signal output elements such as the downstream side detection sensor SN1, the upstream side detection sensor SN2, the skew detection sensors SN3, and the paper sensor SN4.

(Control Target Elements)

The controller C outputs signals to the control target elements such as a power supply circuit E, a motor M1 that drives the registration rollers Rr and the transport rollers 1 to 34, a solenoid that is an example of a mover that moves the transport rollers 1, 3, 4, and 31 to 34 between the transport position and the non-nipping position, a motor M2*a* that moves the registration rollers Rr in the width direction of the recording paper S, a motor M2*b* that moves the upstream side correction rollers 11 and 11' in the width direction of the recording paper S, and motors M3*a*, M3*b*, and M3*c* that adjust the contact pressures of the registration rollers Rr and the upstream side correction rollers 11 and 11'.

(Functions of Controller C)

The controller C of the first exemplary embodiment includes the following functional elements (functional modules or program modules) C1 to C7.

A paper type detector C1 that is an example of a medium type detector detects, as examples of the type of the recording paper S, a paper type such as plain paper, thick paper, thin paper, coated paper, metallic paper, or transparent film and the size, in particular, the length of the recording paper S along the transport direction. If a user inputs the type of the recording paper (paper type and size) via the UI, the paper type detector C1 detects information on the input type as the type of the recording paper S. As for the size of the recording paper S, if long paper is used and the user does not input its paper size, the length of the recording paper S may be detected based on a transport speed of the recording paper S and detection results from sensors disposed at various positions in the transport paths SH1 to SH7 to detect passage of the recording paper S, that is, times when the recording paper S has passed by the sensors. The paper type detector C1 of the first exemplary embodiment also detects whether the recording paper S is coated paper or metallic paper having a coating on its surface. The paper type detector C1 of the first exemplary embodiment also detects whether the recording paper S is a medium such as thick paper having a basis weight (weight per unit area) larger than a predetermined threshold or a medium such as plain paper or thin paper having a basis weight smaller than the threshold.

A skew amount detector C2 that is an example of an inclination amount detector detects a skew amount of the recording paper S (inclination amount or angle relative to the transport or width direction) based on detection results from the skew detection sensors SN3. For example, the skew amount detector C2 of the first exemplary embodiment detects the skew amount by calculating a length of deviation in the paper transport direction relative to a unit length in the paper width direction based on the transport speed of the recording paper S and a difference in timings when the left sensor SN3*a* and the right sensor SN3*b* have detected the leading edge of the recording paper S.

A side shift amount detector C3 that is an example of a positional correction amount detector detects positional correction amounts, that is, side shift amounts in the width direction of the recording paper S based on detection results from the side detection sensors SN1 and SN2. The side shift amount detector C3 of the first exemplary embodiment detects a side shift amount at the leading edge of the recording paper S based on the detection result from the downstream side detection sensor SN1. If the side edge of the recording paper S is detected by the downstream side detection sensor SN1 and the trailing edge of the recording paper S is also detected by the upstream side detection sensor SN2, that is, if the recording paper S is longer than the length between the registration rollers Rr and the first upstream side correction rollers 11 (or the second upstream side correction rollers 11'), the side shift amount detector C3 detects a side shift amount at the trailing edge of the recording paper S based on the detection result from the upstream side detection sensor SN2. That is, the leading and trailing side shift amounts are detected based on the detection results from the downstream side detection sensor SN1 and the first upstream side detection sensor SN2*a* during simplex printing or first-side printing in duplex printing, and are detected based on the detection results from the downstream side detection sensor SN1 and the second upstream side detection sensor SN2*b* during second-side printing in the duplex printing.

Figure 7A:
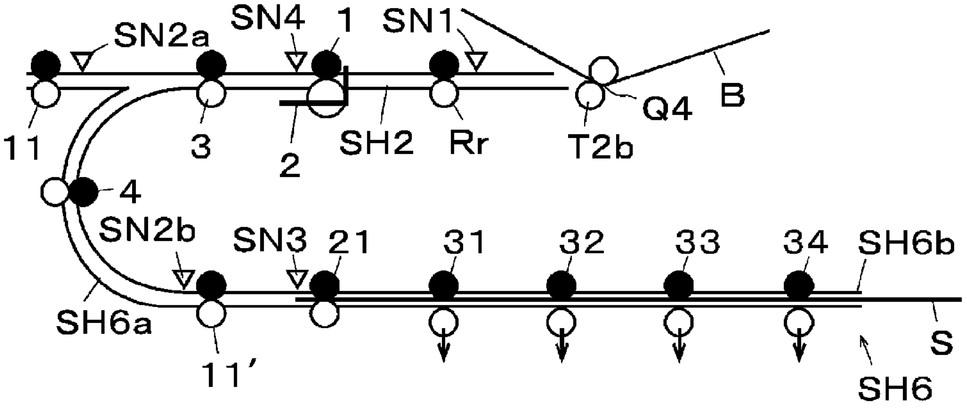
FIG. 7A illustrates an operation of the first exemplary embodiment during skew amount detection.
Figure 7B:
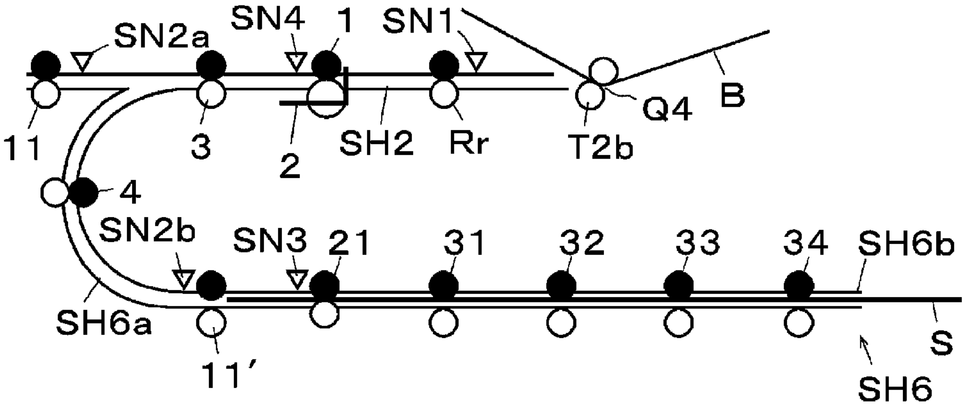
FIG. 7B illustrates an operation of the first exemplary embodiment during rough adjustment.
Figure 7C:
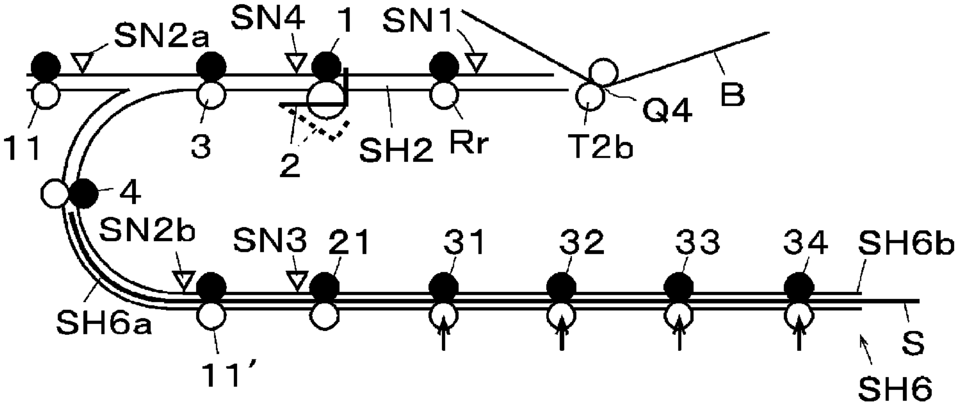
FIG. 7C illustrates an operation of the first exemplary embodiment after the rough adjustment.
Figure 7D:
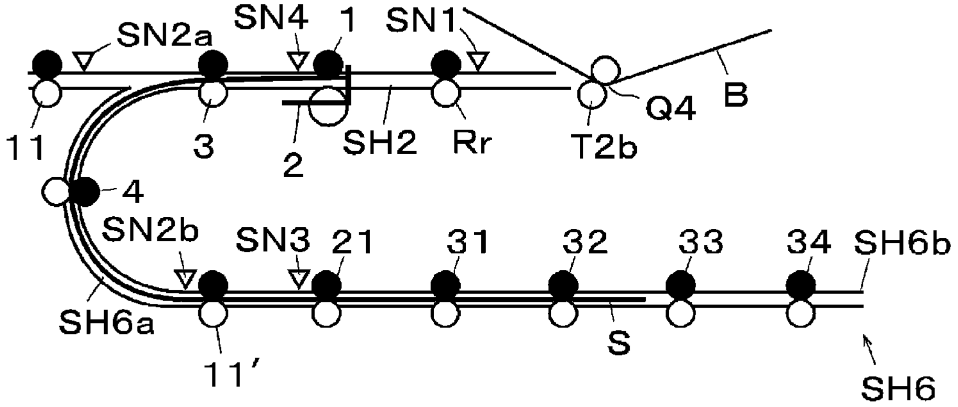
FIG. 7D illustrates an operation of the first exemplary embodiment during fine adjustment.
Figure 7E:
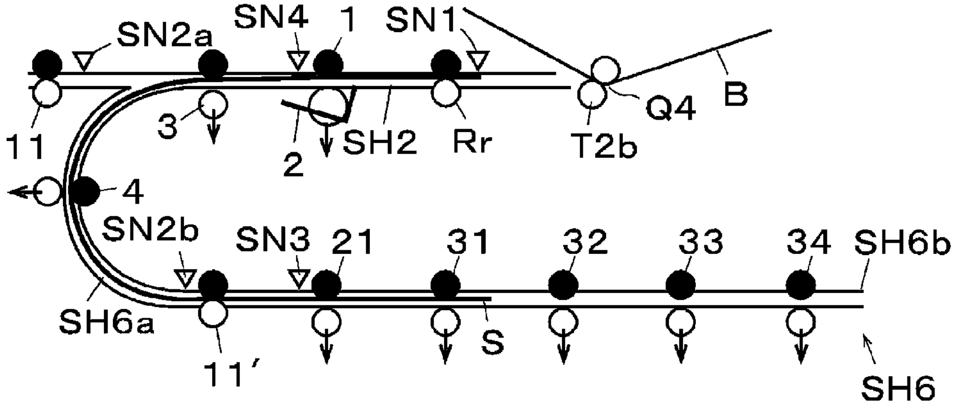
FIG. 7E illustrates an operation of the first exemplary embodiment during side shift correction.

FIG. 7A illustrates an operation of the first exemplary embodiment during skew amount detection. FIG. 7B illustrates an operation of the first exemplary embodiment during rough adjustment. FIG. 7C illustrates an operation of the first exemplary embodiment after the rough adjustment. FIG. 7D illustrates an operation of the first exemplary embodiment during fine adjustment. FIG. 7E illustrates an operation of the first exemplary embodiment during side shift correction.

A skew corrector C4 that is an example of an inclination correction controller includes a rough adjuster C4A and a fine adjuster C4B, and corrects a skew of the recording paper S.

The rough adjuster C4A that is an example of a second inclination correction controller includes a rotational speed setter C4A1, and corrects the skew of the recording paper S. In FIG. 7A and FIG. 7B, the rough adjuster C4A of the first exemplary embodiment controls the skew correction rollers 21 to correct the skew of the recording paper S, thereby performing the rough adjustment that is an example of second inclination correction.

Based on the skew amount detected by the skew amount detector C2, the rotational speed setter C4A1 sets rotational speeds of the skew correction rollers 21 to reduce the skew amount. For example, if the recording paper S has such an inclination that the left side in the paper width direction advances compared with the right side, the rotational speed setter C4A1 of the first exemplary embodiment reduces the skew amount by setting the rotational speed of the left rollers 21*a* to be lower than the rotational speed of the right rollers 21*b*. The speed difference between the left rollers 21*a* and the right rollers 21*b* may be set based on the detected skew amount. The skew correction may be performed not only by setting the rotational speeds of the rollers 21*a* and 21*b* based on the skew amount, but also by, for example, providing two levels that are "high" and "low" for the rotational speeds and adjusting a timing to switch the rotational speed on the advancing side from "high" to "low", that is, a period to transport the advancing side at a low speed based on the skew amount.

The fine adjuster C4B that is an example of a first inclination correction controller corrects the skew of the recording paper S on a downstream side of the recording paper S having undergone the skew correction at the skew correction rollers 21. In FIG. 7D, the fine adjuster C4B of the first exemplary embodiment corrects the skew of the recording paper S by bringing the leading edge of the recording paper S into abutment against the abutment gate 2. That is, the fine adjustment that is an example of first inclination correction is performed by correcting the skew of the recording paper S using the abutment gate 2. In the first exemplary embodiment, the abutment gate 2 is controlled to move to the abutment position when the recording paper S is transported along the circulation path SH6. The abutment gate 2 is controlled to move to the retraction position when a predetermined period (abutment period) has elapsed since the leading edge of the recording paper S reached the abutment gate 2 based on a result of detection of the leading edge of the recording paper S by the paper sensor SN4.

In the first exemplary embodiment, the skew correction is the fine adjustment using the abutment gate 2 during the simplex printing or the first-side printing in the duplex printing, and is both the rough adjustment and the fine adjustment during the second-side printing in the duplex printing.

A side shifter C5 that is an example of a first adjuster and a positional correction controller corrects the positions of the edges of the recording paper S in the width direction by moving the registration rollers Rr and the upstream side correction rollers 11 or 11' in the axial direction based on the side shift amounts detected by the side shift amount detector C3. In FIG. 7E, the side shifter C5 of the first exemplary embodiment corrects the positions by causing the registration rollers Rr to move (side-shift) the recording paper S in the width direction if the length of the recording paper S is smaller than the length between the registration rollers Rr and the first upstream side correction rollers 11 (or the second upstream side correction rollers 11').

The side shifter C5 corrects the positions by causing the registration rollers Rr and the upstream side correction rollers 11 or 11' to move (side-shift) the recording paper S in the width direction if the length of the recording paper S is larger than the length between the registration rollers Rr and the first upstream side correction rollers 11 (or the second upstream side correction rollers 11'). Thus, if the recording paper S is long, the position of the recording paper S in the width direction is corrected by moving the registration rollers Rr in the axial direction based on the side shift amount detected by the downstream side detection sensor SN1 and moving the upstream side correction rollers 11 or 11' in the axial direction based on the side shift amount detected by the upstream side detection sensor SN2. Specifically, the long recording paper S transported along the medium transport path SH2 is side-shifted by the registration rollers Rr and the first upstream side correction rollers 11, and the long recording paper S transported along the circulation path SH6 is side-shifted by the registration rollers Rr and the second upstream side correction rollers 11'.

A contact pressure adjuster C6 that is an example of a second adjuster adjusts the contact pressure of the registration rollers Rr for the recording paper S and the contact pressure of the upstream side correction rollers 11 or 11' for the recording paper S based on resistance caused when the recording paper S is moved in the width direction. That is, the contact pressures of the registration rollers Rr and the upstream side correction rollers 11 or 11' are adjusted based on movement resistance such as frictional resistance caused by contact with the wall of the transport path SH2 or SH6 or the separated rollers 1, 3, 4, 21, or 31 to 34 when the recording paper S is moved in the width direction in the medium transport path SH2 or the circulation path SH6. That is, if the movement resistance is high and the contact pressures are low, the recording paper S being side-shifted may slip on the registration rollers Rr or the upstream side correction rollers 11 or 11' and the movement amount of the recording paper S may fail to reach the target side shift amount. In the first exemplary embodiment, the contact pressures are increased if the movement resistance is high, and are reduced if the movement resistance is low.

In the first exemplary embodiment, the movement amount in the width direction, that is, the side shift amount may differ between the registration rollers Rr and the upstream side correction rollers 11 or 11', and the cumulative movement resistance is likely to increase as the side shift amount increases. Therefore, the contact pressure adjuster C6 of the first exemplary embodiment adjusts the contact pressures so that the contact pressure of the registration rollers Rr or the upstream side correction rollers 11 or 11' having a larger side shift amount increases.

In a case where the recording paper S has a length illustrated in FIGS. 7A to 7E, the recording paper S is hardly present on the downstream side of the registration rollers Rr during the side shift, and the registration rollers Rr have a long distance to the curved part of the junction path SH6*a* where the resistance is likely to increase. The recording paper S is present on the upstream side and the downstream side of the second upstream side correction rollers 11', and the second upstream side correction rollers 11' have a short distance to the curved part of the junction path SH6*a* where the resistance is likely to increase. Therefore, the resistance is generally lower on the registration rollers Rr than on the second upstream side correction rollers 11'. Thus, if the recording paper S is transported along the circulation path SH6 and the side shift amount at the registration rollers Rr is equal to the side shift amount at the second upstream side correction rollers 11', the contact pressure adjuster C6 of the first exemplary embodiment adjusts and sets the contact pressure of the registration rollers Rr on the downstream side to be lower than the contact pressure of the second upstream side correction rollers 11' on the upstream side. If the contact pressure of the registration rollers Rr on the downstream side is adjusted to be lower than the contact pressure of the second upstream side correction rollers 11' but the side shift amount at the registration rollers Rr is larger due to, for example, individual differences of the recording paper S, the contact pressure of the registration rollers Rr may be increased as an end result.

If the recording paper S is transported along the medium transport path SH2, the resistance on the first upstream side correction rollers 11 is likely to be lower than the resistance on the second upstream side correction rollers 11' because the recording paper S does not pass through the curved junction path SH6*a* and the medium transport path SH2 is straight, but the resistance on the first upstream side correction rollers 11 is likely to be higher than the resistance on the registration rollers Rr because the recording paper S is present on the upstream side of the first upstream side correction rollers 11. In the first exemplary embodiment, the contact pressures are set, for example, in a relationship of (registration rollers Rr)<(first upstream side correction rollers 11)<(second upstream side correction rollers 11').

The contact pressure adjuster C6 of the first exemplary embodiment adjusts the contact pressures of the registration rollers Rr and the upstream side correction rollers 11 or 11' during the side shift period alone. Thus, the contact pressures are not adjusted during a period in which the recording paper S is transported downstream and a period in which the fine adjustment is performed in the skew correction. Instead, the contact pressures are adjusted to transport contact pressures. The transport contact pressure is set to a predetermined contact pressure at which the recording paper S being transported does not slip, and is set lower than, for example, the contact pressure of the registration rollers Rr that is adjusted during the side shift.

In the first exemplary embodiment, the contact pressures of the registration rollers Rr and the upstream side correction rollers 11 or 11' are adjusted during the side shift period alone, but may be set to the side-shift contact pressures during the period in which the recording paper S is transported downstream and the period in which the fine adjustment is performed in the skew correction. That is, the side-shift contact pressures may be set constantly.

The contact pressure adjuster C6 of the first exemplary embodiment adjusts the contact pressures based on the type of the recording paper S. In a case where the type of the recording paper S is coated paper, metallic paper, or a transparent film such as an OHP sheet that is an example of a medium having a coating on its surface, the contact pressure adjuster C6 increases the contact pressures of the registration rollers Rr and the upstream side correction rollers 11 or 11' compared with a case where the type of the recording paper S is not the coated paper or the like. In the medium having the coating on its surface, the coefficient of friction of the coating is lower than that of plain paper or the like and is therefore slippery. To suppress the slip during the side shift, the contact pressures of the registration rollers Rr and the like are increased in the case of the coated paper or the like compared with the plain paper or the like.

In the case where the type of the recording paper S is a medium having a basis weight larger than the predetermined threshold, the contact pressure adjuster C6 of the first exemplary embodiment increases the contact pressures compared with a medium having a basis weight smaller than the threshold. The medium such as thick paper having a large basis weight is not easily curved or deformed because the flexural rigidity, that is, paper stiffness is high. Therefore, the medium having the large basis weight is likely to come into contact with a wall when passing through the curved junction path SH6*a* or the like, thereby increasing the resistance. To suppress insufficiency or failure in the adjustment of the side shift caused by the slip of the recording paper S during the side shift, the contact pressures are increased in the case of the medium having the large basis weight.

The contact pressure adjuster C6 of the first exemplary embodiment increases the contact pressures in a case where the length of the recording paper S is larger than a predetermined length compared with a case where the length is shorter than the predetermined length. For example, the contact pressures are increased in a case where the length of the recording paper S in the transport direction is larger than the length between the registration rollers Rr and the second upstream side correction rollers 11'.

For example, in a case where the recording paper S is a coated medium, a medium having a large basis weight, or a long medium, the contact pressures of the registration rollers Rr and the upstream side correction rollers 11 or 11' may be increased by several percent compared with a case where the recording paper S is none of those media.

The setting of the contact pressures of the registration rollers Rr, the first upstream side correction rollers 11, and the second upstream side correction rollers 11' may be controlled by predetermining the contact pressures through experiments or the like in association with the type of the recording paper S, storing the contact pressures in the form of a lookup table, and reading information associated with the type of the recording paper S during actual image formation. Instead of using the lookup table, a deviation between a target side shift amount and an actual side shift amount may be detected by the sensors SN1 and SN2, and the contact pressures may be adjusted based on the deviation during the next side shift.

In the first exemplary embodiment, the contact pressures of the registration rollers Rr, the first upstream side correction rollers 11, and the second upstream side correction rollers 11' may be controlled at specific values derived through the experiments or the like, or may be controlled by calculation based on the ratio of the contact pressures of the rollers Rr, 11, and 11'.

A separation controller C7 controls each of the rollers 1 to 34 to move to the non-nipping position or the transport position during the skew correction or side shift operation.

To perform the skew correction (rough adjustment) using the skew correction rollers 21 in FIG. 7A and FIG. 7B, the separation controller C7 of the first exemplary embodiment moves the skew correction rollers 21 to the transport position and moves the transport rollers 31 to 34 on the upstream side of the skew correction rollers 21 to the non-nipping position.

In the first exemplary embodiment, if the skew amount detected by the skew amount detector C2 has reached a predetermined amount (threshold), the second upstream side correction rollers 11' are also moved to the non-nipping position. If the skew amount has not reached the threshold and the type of the recording paper S is a paper type easy to correct the skew, the second upstream side correction rollers 11' are kept at the transport position. If the skew amount has not reached the threshold and the type of the recording paper S is not the paper type easy to correct the skew, the second upstream side correction rollers 11' are moved to the non-nipping position. In the first exemplary embodiment, examples of the paper type easy to correct the skew include plain paper and thin paper, and examples of the paper type that is not easy to correct the skew include thick paper and long paper.

In the first exemplary embodiment, the second upstream side correction rollers 11' are moved to the non-nipping position during the skew correction depending on the magnitude of the skew amount and the paper type. Alternatively, the second upstream side correction rollers 11' may be kept at the non-nipping position during the rough adjustment irrespective of the skew amount and the paper type in a case where, for example, the skew amount is likely to increase in view of the structure of the circulation path SH6. Conversely, the second upstream side correction rollers 11' may be kept at the transport position irrespective of the skew amount and the paper type in a case where the skew amount is unlikely to increase in view of the structure of the circulation path SH6.

In the first exemplary embodiment, all the transport rollers 31 to 34 on the upstream side are not moved to the non-nipping position, but any of the transport rollers 31 to 34 in contact with the recording paper S are moved to the non-nipping position based on the length of the recording paper S. When the length of the recording paper S is small, only the transport rollers 31 may be moved to the non-nipping position. When the length of the recording paper S is large, all the transport rollers 31 to 34 may be moved to the non-nipping position. Thus, when the skew correction rollers 21 perform the skew correction, only the skew correction rollers 21 are controlled to come into contact with the recording paper S, and the other rollers 11' and 31 to 34 are controlled not to come into contact with the recording paper S. At this time, the transport rollers 1, 3, and 4 on the downstream side of the second upstream side correction rollers 11' are moved to the transport position. The rough adjustment is finished at a predetermined timing before the leading edge of the recording paper S reaches the third transport rollers 4.

In FIG. 7C, when the rough adjustment is finished, the transport rollers 31 to 34 on the upstream side of the skew correction rollers 21 are moved to the transport position. If the second upstream side correction rollers 11' are at the non-nipping position, the second upstream side correction rollers 11' are also moved to the transport position. In FIG. 7D, the skew correction (fine adjustment) using the abutment gate 2 is performed next. Although the fine adjustment is performed with the rollers 1 to 34 moved to the transport position in the first exemplary embodiment, the fine adjustment may be performed with the rollers 3 to 34 moved to the non-nipping position, excluding the first transport rollers 1 near the abutment gate 2 on the upstream side.

In FIG. 7E, when the fine adjustment is finished and the side shift operation is started with the leading edge of the recording paper S nipped by the registration rollers Rr, the rollers other than the registration rollers Rr and the upstream side correction rollers 11 and 11' are moved to the non-nipping position. During the side shift operation, the recording paper S is nipped by the registration rollers Rr and the upstream side correction rollers 11 or 11' (first upstream side correction rollers 11 or second upstream side correction rollers 11').

After the position of the recording paper S is corrected by the side shift operation, all the rollers 1, 3, 4, 21, and 31 to 34 at the non-nipping position are moved to the transport position.

Flowchart of First Exemplary Embodiment

Referring to a flowchart, description is made about a flow of control in the copying machine U of the first exemplary embodiment.

Figure 8:
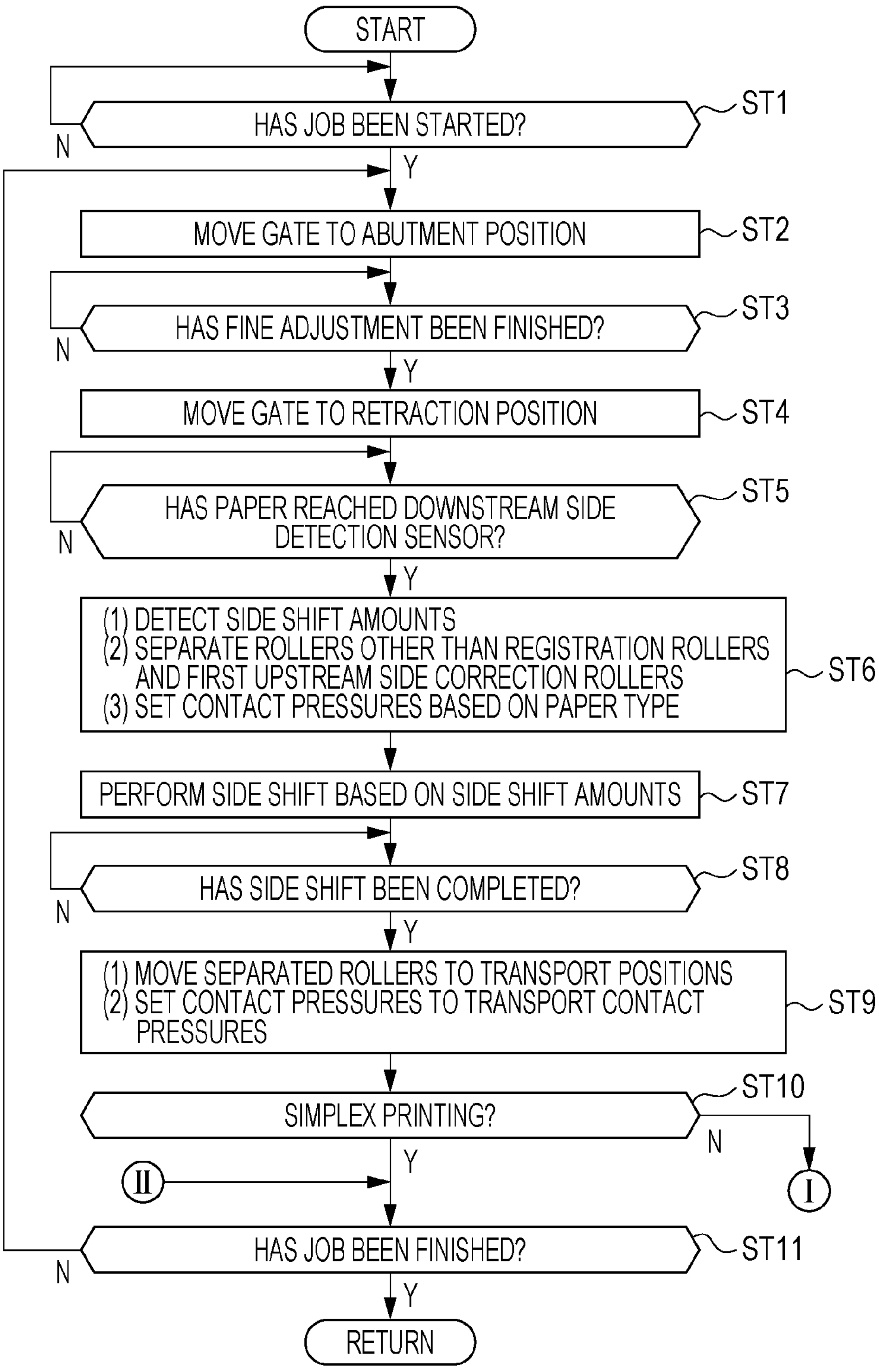
FIG. 8 is a flowchart of skew correction and side shift operations of the first exemplary embodiment.

FIG. 8 is a flowchart of the skew correction and side shift operations of the first exemplary embodiment.

Figure 9:
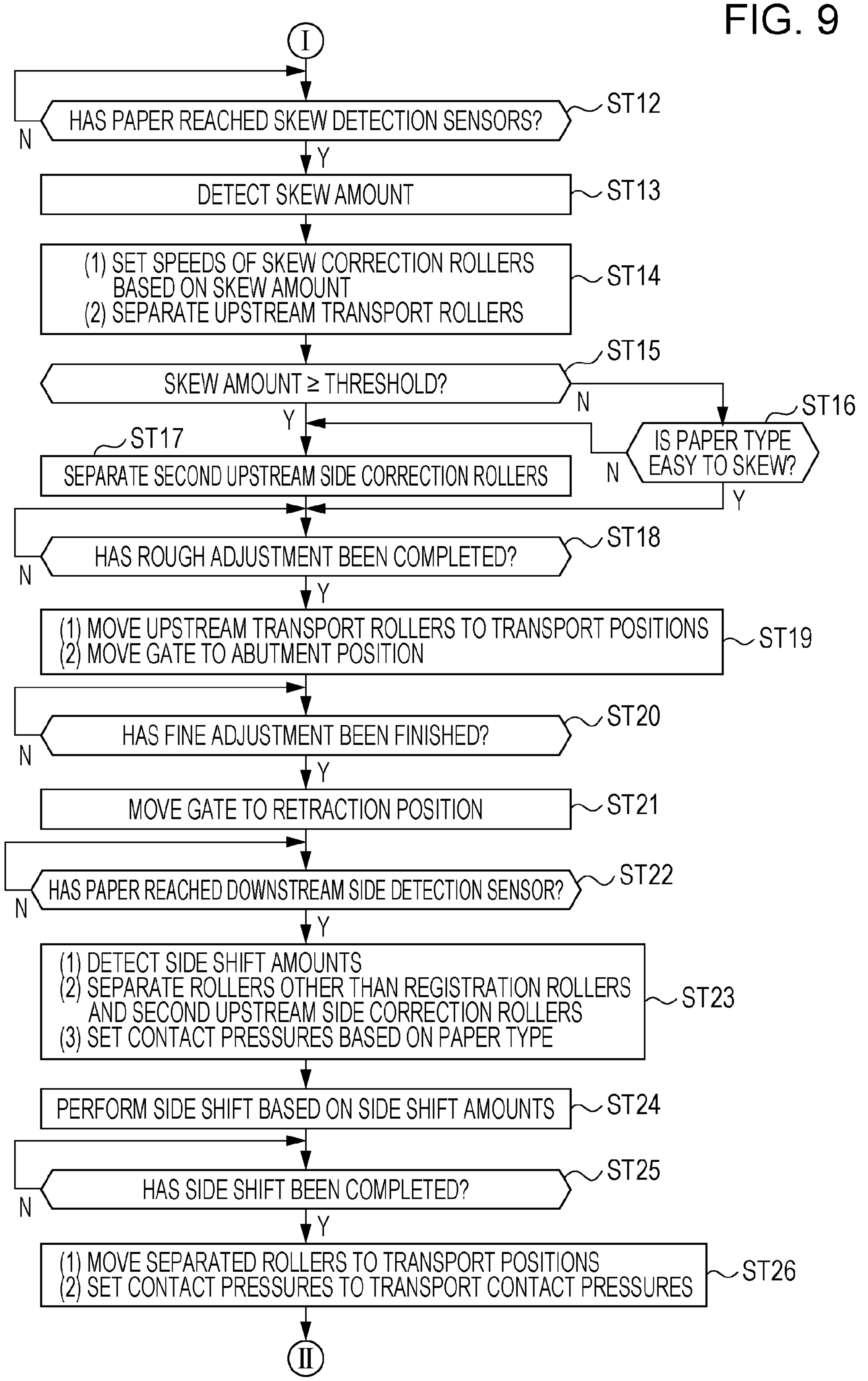
FIG. 9 is a flowchart of continuation of FIG. 8.

FIG. 9 is a flowchart of continuation of FIG. 8.

A process of each step ST in the flowcharts of FIG. 8 and FIG. 9 is performed based on a program stored in the controller C. The process is performed parallel to various other processes in the copying machine U.

The flow of FIG. 8 and FIG. 9 is started when the copying machine U is powered ON.

In ST1 of FIG. 8, determination is made as to whether an image forming job has been started. If the determination result is "YES" (Y), the process proceeds to ST2. If the determination result is "NO" (N), ST1 is repeated.

In ST2, the abutment gate 2 is moved to the abutment position, and the process proceeds to ST3.

In ST3, determination is made as to whether the fine adjustment using the abutment gate 2 has been completed. That is, determination is made as to whether a predetermined period has elapsed since the abutment gate 2 was moved to the abutment position and the leading edge of the recording paper S has abutted against the abutment gate 2 to complete the skew correction. If the determination result is "YES" (Y), the process proceeds to ST4. If the determination result is "NO" (N), ST3 is repeated.

In ST4, the abutment gate 2 is moved to the retraction position. Then, the process proceeds to ST5.

In ST5, determination is made as to whether the recording paper S has reached the downstream side detection sensor SN1. If the determination result is "YES" (Y), the process proceeds to ST6. If the determination result is "NO" (N), ST5 is repeated.

In ST6, the following processes (1) to (3) are executed, and the process proceeds to ST7.

(1) Side shift amounts are detected based on detection results from the downstream side detection sensor SN1 and the first upstream side detection sensor SN2*a*.

(2) The rollers 1 and 3 (and 4, 21, 31 to 34) other than the registration rollers Rr and the first upstream side correction rollers 11 are moved to the non-nipping position.

(3) The contact pressures of the registration rollers Rr and the first upstream side correction rollers 11 are set based on the type of the recording paper S.

In ST7, the positions of the side edges of the recording paper S are corrected by moving (side-shifting) the registration rollers Rr and the first upstream side correction rollers 11 in the axial direction based on the side shift amounts. Then, the process proceeds to ST8.

In ST8, determination is made as to whether the side shift has been completed. That is, determination is made as to whether both the registration rollers Rr and the first upstream side correction rollers 11 have finished moving by their side shift amounts. If the determination result is "YES" (Y), the process proceeds to ST9. If the determination result is "NO" (N), ST8 is repeated.

In ST9, the following processes (1) and (2) are executed, and the process proceeds to ST10.

(1) The rollers 1 and 3 (and 4, 21, 31 to 34) at the non-nipping position are moved to the transport position.

(2) The contact pressures of the registration rollers Rr and the first upstream side correction rollers 11 are set to the transport contact pressures.

In ST10, determination is made as to whether the job is simplex printing. If the determination result is "YES" (Y), the process proceeds to ST11. If the determination result is "NO" (N), the process proceeds to ST12.

In ST11, determination is made as to whether the job has been finished. If the determination result is "YES" (Y), the process returns to ST1. If the determination result is "NO" (N), the process returns to ST2.

In ST12, determination is made as to whether the recording paper S has reached the skew detection sensors SN3. If the determination result is "YES" (Y), the process proceeds to ST13. If the determination result is "NO" (N), ST12 is repeated.

In ST13, a skew amount is detected based on detection results from the skew detection sensors SN3. Then, the process proceeds to ST14.

In ST14, the following processes (1) and (2) are executed, and the process proceeds to ST15.

(1) The speeds of the skew correction rollers 21 are set based on the skew amount.

(2) The transport rollers 31 to 34 on the upstream side are moved to the non-nipping position based on the length of the recording paper S.

In ST15, determination is made as to whether the detected skew amount has reached the threshold. If the determination result is "NO" (N), the process proceeds to ST16. If the determination result is "YES" (Y), the process proceeds to ST17.

In ST16, determination is made as to whether the type of the recording paper S is a paper type easy to correct the skew, that is, either plain paper or thin paper. If the determination result is "NO" (N), the process proceeds to ST17. If the determination result is "YES" (Y), the process proceeds to ST18.

In ST17, the second upstream side correction rollers 11' are moved to the non-nipping position. Then, the process proceeds to ST18.

In ST18, determination is made as to whether the rough adjustment using the skew correction rollers 21 has been completed. If the determination result is "YES" (Y), the process proceeds to ST19. If the determination result is "NO" (N), ST18 is repeated.

In ST19, the following processes (1) and (2) are executed, and the process proceeds to ST20.

(1) The upstream transport rollers 31 to 34 at the non-nipping position are moved to the transport position.

(2) The abutment gate 2 is moved to the abutment position.

In ST20, determination is made as to whether the fine adjustment using the abutment gate 2 has been completed. That is, determination is made as to whether a predetermined period has elapsed since the abutment gate 2 was moved to the abutment position and the leading edge of the recording paper S has abutted against the abutment gate 2 to complete the skew correction. If the determination result is "YES" (Y), the process proceeds to ST21. If the determination result is "NO" (N), ST20 is repeated.

In ST21, the abutment gate 2 is moved to the retraction position. Then, the process proceeds to ST22.

In ST22, determination is made as to whether the recording paper S has reached the downstream side detection sensor SN1. If the determination result is "YES" (Y), the process proceeds to ST23. If the determination result is "NO" (N), ST22 is repeated.

In ST23, the following processes (1) to (3) are executed, and the process proceeds to ST24.

(1) Side shift amounts are detected based on detection results from the downstream side detection sensor SN1 and the second upstream side detection sensor SN2*b*.

(2) The rollers 1, 3, 4, 21, and 31 to 34 other than the registration rollers Rr and the second upstream side correction rollers 11' are moved to the non-nipping position.

(3) The contact pressures of the registration rollers Rr and the second upstream side correction rollers 11' are set based on the type of the recording paper S.

In ST24, the positions of the side edges of the recording paper S are corrected by moving (side-shifting) the registration rollers Rr and the second upstream side correction rollers 11' in the axial direction based on the side shift amounts. Then, the process proceeds to ST25.

In ST25, determination is made as to whether the side shift has been completed. That is, determination is made as to whether both the registration rollers Rr and the second upstream side correction rollers 11' have finished moving by their side shift amounts. If the determination result is "YES"

(Y), the process proceeds to ST26. If the determination result is "NO" (N), ST25 is repeated.

In ST26, the following processes (1) and (2) are executed, and the process returns to ST11.

(1) The rollers 1, 3, 4, 21, and 31 to 34 at the non-nipping position are moved to the transport position.

(2) The contact pressures of the registration rollers Rr and the second upstream side correction rollers 11' are set to the transport contact pressures.

Operations of First Exemplary Embodiment

During the duplex printing in the copying machine U of the first exemplary embodiment having the structure described above, the recording paper S having an image recorded on the first side is reversed by being transported along the circulation path SH6. The transported recording paper S is sent to the second transfer area Q4 while being corrected in terms of an inclination (skew) and side edge misregistration that have occurred during the transport. Printing on the second side is performed with reduced misalignment of images on both sides.

In the first exemplary embodiment, the skew correction is first performed by the skew correction rollers 21 on the upstream side along the paper transport direction in the circulation path SH6. Then, the skew correction is performed by the abutment gate 2 on the downstream side. Then, the side edge misregistration of the recording paper S is corrected (side shift correction is performed) after the skew correction. During the simplex printing in which the skew is relatively smaller than that in the duplex printing because the transport distance to the second transfer area Q4 is short compared with a case where the recording paper S passes through the circulation path SH6, the skew correction at the abutment gate 2 and the side shift correction are performed.

In the first exemplary embodiment, the side shift correction for the recording paper S that is long in the transport direction is performed by the registration rollers Rr and the first upstream side correction rollers 11 or by the registration rollers Rr and the second upstream side correction rollers 11'. At this time, the contact pressures of the registration rollers Rr and the upstream side correction rollers 11 or 11' are adjusted based on the resistance caused when the recording paper S is moved in the width direction. In particular, in the first exemplary embodiment, the side shift correction is performed by the registration rollers Rr and the first upstream side correction rollers 11 during the simplex printing or the first-side printing in the duplex printing, and is performed by the registration rollers Rr and the second upstream side correction rollers 11' during the second-side printing in the duplex printing. When performing the side shift, the contact pressures of the rollers Rr, 11, and 11' are adjusted based on the positions of the rollers Rr, 11, and 11', the paper type, and the side shift amounts.

In particular, in the first exemplary embodiment, the junction path SH6*a* of the circulation path SH6 has an arc shape, and the registration rollers Rr and the second upstream side correction rollers 11' are disposed on the downstream side and the upstream side of the junction path SH6*a*. If the side shift correction is performed with the recording paper S entering the arcuate junction path SH6*a*, the recording paper S may be caught and the side shift correction may be insufficient in a case of long recording paper S. In the first exemplary embodiment, the side shift correction is performed with the recording paper S nipped by the registration rollers Rr and the second upstream side correction rollers 11' disposed across the junction path SH6*a* and with the contact pressures of the registration rollers Rr and the second upstream side correction rollers 11' adjusted based on the movement resistance in the width direction.

In the first exemplary embodiment, during the side shift correction, the rollers 1, 3, 4, and 21 to 34 other than the registration rollers Rr and the upstream side correction rollers 11 or 11' are moved to the non-nipping position. In particular, during the side shift correction, an outer roller 4*a* disposed on an outer side of the arc in the third transport rollers 4 disposed midway along the arcuate junction path SH6*a* is moved to the non-nipping position.

In the first exemplary embodiment, the contact pressure of the registration rollers Rr or the upstream side correction rollers 11 or 11' having a larger side shift amount is adjusted to become higher.

In the first exemplary embodiment, the contact pressure is set lower for the registration rollers Rr on the downstream side where the resistance is generally lower among the registration rollers Rr and the upstream side correction rollers 11 and 11'.

In the first exemplary embodiment, the contact pressures of the registration rollers Rr and the upstream side correction rollers 11 and 11' are set in the relationship of (registration rollers Rr)<(first upstream side correction rollers 11)<(second upstream side correction rollers 11') based on the relationships between the positions of the rollers Rr, 11, and 11' and the recording paper S.

In the first exemplary embodiment, the contact pressures are set high for the recording paper S such as coated paper whose surface is slippery. In the first exemplary embodiment, the contact pressures are also set high for the recording paper S whose movement resistance is likely to increase during the side shift, such as paper having a large basis weight or long paper.

In the related-art structure in which the skew correction rollers perform the skew correction, the skew is corrected while transporting the recording paper S. When the recording paper S has reached next rollers, the skew correction is not performed any more. Therefore, there is an upper limit on the correctable skew amount, and the skew correction may be insufficient in a case of a large skew amount.

The skew correction may be performed by bringing the recording paper S into abutment against a gate instead of using the skew correction rollers. In the correction by abutment, the skew at the leading edge is corrected but the correction may be insufficient for a skew at the trailing edge in the transport direction due to transport after the correction. In particular, the skew correction may become difficult as the length of the recording paper S increases.

In the first exemplary embodiment, the skew correction is performed by the skew correction rollers 21 on the upstream side, and then performed also by the abutment gate 2 on the downstream side. In other words, the skew correction is performed roughly by the skew correction rollers 21 on the upstream side (rough adjustment), and the final skew correction is performed by the abutment gate 2 on the downstream side (fine adjustment).

In the first exemplary embodiment, the skew correction rollers 21 on the upstream side correct the skew by individually controlling the driving of the rollers 21*a* and 21*b* on both sides in the width direction. Although an abutment gate may be provided in place of the skew correction rollers 21, the transport of the recording paper S is temporarily stopped by the abutment gate. Therefore, a problem arises in that the entire transport of the recording paper S is delayed due to the abutment gates provided in two stages. In the first exemplary embodiment, the skew correction rollers 21 perform the skew correction while transporting the recording paper S downstream.

In the first exemplary embodiment, the skew is corrected by causing a difference in the transport between one edge and the other edge in the width direction by varying the rotational speeds of the rollers 21*a* and 21*b* based on the skew amount. The timing to switch the rotational speed from "high" to "low" may be adjusted based on the skew amount.

In the first exemplary embodiment, the second upstream side correction rollers 11' are also moved to the non-nipping position during the skew correction by the skew correction rollers 21 if the skew amount is large or the type of the recording paper S is not the paper type easy to correct the skew. Therefore, if the second upstream side correction rollers 11' have been moved to the non-nipping position, the skew is corrected by the skew correction rollers 21 until the leading edge of the recording paper S reaches the third transport rollers 4. If the second upstream side correction rollers 11' are kept at the transport position and the leading edge of the recording paper S is nipped by the second upstream side correction rollers 11', the skew correction is not performed any more. If the skew correction is continued with the recording paper S nipped by the second upstream side correction rollers 11', the recording paper S may be twisted or distorted between the second upstream side correction rollers 11' and the skew correction rollers 21 to cause damage such as creasing or ripping.

In the first exemplary embodiment, during the skew correction by the skew correction rollers 21, the transport rollers 31 to 34 on the upstream side are moved to the non-nipping position. If the recording paper S is nipped by the transport rollers 31 to 34 during the correction by the skew correction rollers 21, the skew correction may be hindered and the recording paper S may be creased or ripped by distortion. In the first exemplary embodiment, during the skew correction by the skew correction rollers 21, the recording paper S is not nipped by the transport rollers 31 to 34 but is nipped by the skew correction rollers 21 alone. In particular, in the first exemplary embodiment, any of the transport rollers 31 to 34 to be moved to the non-nipping position are selected based on the length of the recording paper S.

In the first exemplary embodiment, the skew correction rollers 21, the transport rollers 31 to 34, and the second upstream side correction rollers 11' are disposed in the flat upstream portion SH6*b* of the circulation path SH6. Therefore, the skew correction is performed by the skew correction rollers 21 with the recording paper S kept in a flat posture. In a case of skew correction performed at a position where the recording paper S is in a curved or wavy posture, the curved recording paper S may hinder the skew correction by coming into contact with or interfering with the wall in the transport path, thereby causing insufficiency of correction.

In the first exemplary embodiment, the second upstream side correction rollers 11' are disposed on an immediately downstream side of the skew correction rollers 21. In a structure in which one or more transport members are disposed between the second upstream side correction rollers 11' and the skew correction rollers 21, the length of the circulation path SH6 increases and the size of the entire device increases. Further, the transport distance increases and a skew may newly occur.

In the first exemplary embodiment, the abutment gate 2 is used in the fine adjustment. During the fine adjustment, the rollers other than the first transport rollers 1 are moved to the non-nipping position. When separating the rollers other than the first transport rollers 1, any of the transport rollers 3 to 34 to be separated are selected based on the length of the recording paper S.

Modifications

Modifications (H01) to (H07) of the exemplary embodiment of the present disclosure are described below.

(H01) In the exemplary embodiment, the copying machine U is provided as the example of the image forming apparatus. The image forming apparatus may be a FAX machine or a multifunction peripheral having a plurality of functions of a FAX machine, a printer, and a copying machine. The image forming apparatus is not limited to the multicolor-development image forming apparatus, and may be a monochrome image forming apparatus. Further, any electronic or mechanical apparatus using motors and gears may be an alternative to the image forming apparatus.

(H02) In the exemplary embodiment, the skew correction is performed on all types of recording paper S. For example, the rough adjustment or the fine adjustment may be skipped in a case of thick paper that is relatively unlikely to cause a skew, and both the rough adjustment and the fine adjustment may be performed only in a case of plain paper.

(H03) In the exemplary embodiment, the skew correction rollers 21 are used in the rough adjustment, and the abutment gate 2 is used in the fine adjustment. The skew correction rollers may be used both in the rough adjustment and in the fine adjustment. The abutment gates may be used both in the rough adjustment and in the fine adjustment. The abutment gate may be used in the rough adjustment, and the skew correction rollers may be used in the fine adjustment.

Although the fine adjustment and the rough adjustment are performed, the rough adjustment alone may be performed without the fine adjustment or the fine adjustment alone may be performed without the rough adjustment if either the rough adjustment or the fine adjustment suffices as the skew correction in view of the structures of the transport path and the members.

Although the skew correction is performed twice, that is, the rough adjustment and the fine adjustment are performed, the skew correction may be performed three times or more.

(H04) In the exemplary embodiment, the side shift correction is performed at the horizontal medium transport path SH2 and the arcuate circulation path SH6, but may be performed in an image forming apparatus having a transport path in any shape. Even in a case of a small-size image forming apparatus in which a flat transport path is not secured on the upstream side of the registration rollers Rr, the contact pressures may be adjusted by predetermining the movement resistance during the side shift through experiments or the like.

(H05) In the exemplary embodiment, when the rollers are moved to the non-nipping position, the rollers are completely separated from the recording paper S, that is, the contact pressure with the paper is kept zero. Alternatively, the recording paper S and the rollers may slip on each other in such a manner that the rollers are not completely separated from the recording paper and the contact pressure is kept lower than that during the transport of the recording paper.

(H06) In the exemplary embodiment, the side shift correction is performed by nipping the recording paper S by the two types of roller that are the registration rollers Rr on the downstream side and the upstream side correction rollers 11 or 11' on the upstream side, but three or more types of roller may be used.

(H07) In the exemplary embodiment, the side shift amounts are detected by using the two upstream side detection sensors SN2*a* and SN2*b*. For example, the registration rollers Rr and the upstream side correction rollers 11 or 11' may be side-shifted by the same amount based on the detection result from the downstream side detection sensor SN1 without providing the upstream side detection sensors SN2.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A medium transport device comprising:

a first transporter configured to transport a medium by nipping the medium along with rotation;

a second transporter configured to transport the medium and disposed on an upstream side of the first transporter in a transport direction of the medium;

a first adjuster configured to adjust a position of the medium in a width direction by moving the first transporter and the second transporter in the width direction of the medium with the medium nipped by the first transporter and the second transporter; and a second adjuster configured to adjust a contact pressure of the first transporter for the medium and a contact pressure of the second transporter for the medium based on resistance caused when the medium is moved in the width direction.

(((2)))

The medium transport device according to (((1))), further comprising a transport path disposed between the first transporter and the second transporter, configured such that the medium is transported, and having a curved shape in the transport direction.

(((3)))

The medium transport device according to (((1))) or (((2))), wherein the contact pressure of either one of the first transporter and the second transporter having a larger movement amount is set higher than the contact pressure of the other one of the first transporter and the second transporter having a smaller movement amount, comparing an amount of movement of the medium in the width direction by the first transporter due to the resistance and an amount of movement of the medium in the width direction by the second transporter due to the resistance.

(((4)))

The medium transport device according to any one of (((1))) to (((3))), wherein the contact pressure of the first transporter is set lower than the contact pressure of the second transporter.

(((5)))

The medium transport device according to any one of (((1))) to (((4))), wherein the second adjuster is configured to adjust the contact pressures during an operation of moving the medium in the width direction.

(((6)))

The medium transport device according to any one of (((1))) to (((4))), wherein the second adjuster is configured to adjust the contact pressures over an entire operation of transporting the medium.

(((7)))

The medium transport device according to any one of (((1))) to (((6))), wherein the second adjuster is configured to adjust the contact pressures based on a type of the medium.

(((8)))

The medium transport device according to (((7))), wherein the contact pressure for a medium having a coating on a surface thereof is higher than the contact pressure for a medium having no coating on a surface thereof.

(((9)))

The medium transport device according to (((7))) or (((8))), wherein the contact pressure for a medium having a basis weight larger than a predetermined value is higher than the contact pressure for a medium having a basis weight lower than the predetermined value.

(((10)))

The medium transport device according to any one of (((7))) to (((9))), wherein the contact pressure for a medium having a length larger than a predetermined length is higher than the contact pressure for a medium having a length smaller than the predetermined length.

(((11)))

An image forming apparatus comprising:

the medium transport device according to any one of (((1))) to (((10))) configured to transport a medium; and an image former configured to form an image on the medium.

(((12)))

The image forming apparatus according to (((11))), wherein the first transporter is disposed on an upstream side of a transfer area where the image is transferred onto the medium.

(((13)))

The image forming apparatus according to (((11))) or (((12))), wherein the second transporter comprises:

a first-side transporter disposed in a first transport path where the medium is transported before printing on a first side of the medium in duplex printing; and a second-side transporter disposed in a second transport path where the medium is transported after the printing of an image on the first side and before printing on a second side, and wherein the first adjuster is configured to, for the medium transported along the first transport path, move the medium in the width direction by the first transporter and the first-side transporter and, for the medium transported along the second transport path, move the medium in the width direction by the first transporter and the second-side transporter.

(((14)))

The image forming apparatus according to (((13))), wherein the second adjuster is configured to, in a case where the medium is transported along the second transport path, set the contact pressures to become higher than in a case where the medium is transported along the first transport path.

What is claimed is:

1. A medium transport device comprising:

a first transporter configured to transport a medium by nipping the medium along with rotation;

a second transporter configured to transport the medium and disposed on an upstream side of the first transporter in a transport direction of the medium;

a first adjuster configured to adjust a position of the medium in a width direction by moving the first transporter and the second transporter in the width direction of the medium with the medium nipped by the first transporter and the second transporter; and a second adjuster configured to adjust a contact pressure of the first transporter for the medium and a contact pressure of the second transporter for the medium based on resistance caused when the medium is moved in the width direction and a type of the medium, wherein the contact pressure for a medium having a coating on a surface thereof is higher than the contact pressure for a medium having no coating on a surface thereof.

2. The medium transport device according to claim 1, further comprising a transport path disposed between the first transporter and the second transporter, configured such that the medium is transported, and having a curved shape in the transport direction.

3. The medium transport device according to claim 1, wherein the contact pressure of either one of the first transporter and the second transporter having a larger movement amount is set higher than the contact pressure of the other one of the first transporter and the second transporter having a smaller movement amount, comparing an amount of movement of the medium in the width direction by the first transporter due to the resistance and an amount of movement of the medium in the width direction by the second transporter due to the resistance.

4. The medium transport device according to claim 1, wherein the contact pressure of the first transporter is set lower than the contact pressure of the second transporter.

5. The medium transport device according to claim 1, wherein the second adjuster is configured to adjust the contact pressures during an operation of moving the medium in the width direction.

6. The medium transport device according to claim 1, wherein the second adjuster is configured to adjust the contact pressures over an entire operation of transporting the medium.

7. The medium transport device according to claim 1, wherein the contact pressure for a medium having a basis weight larger than a predetermined value is higher than the contact pressure for a medium having a basis weight lower than the predetermined value.

8. The medium transport device according to claim 1, wherein the contact pressure for a medium having a length larger than a predetermined length is higher than the contact pressure for a medium having a length smaller than the predetermined length.

9. An image forming apparatus comprising:

the medium transport device according to claim 1 configured to transport a medium; and an image former configured to form an image on the medium.

10. An image forming apparatus comprising:

the medium transport device according to claim 2 configured to transport a medium; and an image former configured to form an image on the medium.

11. An image forming apparatus comprising:

the medium transport device according to claim 3 configured to transport a medium; and an image former configured to form an image on the medium.

12. An image forming apparatus comprising:

the medium transport device according to claim 4 configured to transport a medium; and an image former configured to form an image on the medium.

13. An image forming apparatus comprising:

the medium transport device according to claim 5 configured to transport a medium; and an image former configured to form an image on the medium.

14. An image forming apparatus comprising:

the medium transport device according to claim 6 configured to transport a medium; and an image former configured to form an image on the medium.

15. The image forming apparatus according to claim 9, wherein the first transporter is disposed on an upstream side of a transfer area where the image is transferred onto the medium.

16. An image forming apparatus comprising:

a first transporter configured to transport a medium by nipping the medium along with rotation;

a second transporter configured to transport the medium and disposed on an upstream side of the first transporter in a transport direction of the medium;

a first adjuster configured to adjust a position of the medium in a width direction by moving the first transporter and the second transporter in the width direction of the medium with the medium nipped by the first transporter and the second transporter;

a second adjuster configured to adjust a contact pressure of the first transporter for the medium and a contact pressure of the second transporter for the medium based on resistance caused when the medium is moved in the width direction and a type of the medium; and an image former configured to form an image on the medium, wherein the second transporter comprises:

a first-side transporter disposed in a first transport path where the medium is transported before printing on a first side of the medium in duplex printing; and a second-side transporter disposed in a second transport path where the medium is transported after the printing of the image on the first side and before printing on a second side, and wherein the first adjuster is configured to, for the medium transported along the first transport path, move the medium in the width direction by the first transporter and the first-side transporter and, for the medium transported along the second transport path, move the medium in the width direction by the first transporter and the second-side transporter.

17. The image forming apparatus according to claim 16, wherein the second adjuster is configured to, in a case where the medium is transported along the second transport path, set the contact pressures to become higher than in a case where the medium is transported along the first transport path.

18. A medium transport device comprising:

a first transporter configured to transport a medium by nipping the medium along with rotation;

a second transporter configured to transport the medium and disposed on an upstream side of the first transporter in a transport direction of the medium;

a first adjuster configured to adjust a position of the medium in a width direction by moving the first transporter and the second transporter in the width direction of the medium with the medium nipped by the first transporter and the second transporter; and a second adjuster configured to adjust a contact pressure of the first transporter for the medium and a contact pressure of the second transporter for the medium based on resistance caused when the medium is moved in the width direction and a type of the medium, wherein the contact pressure for a medium having a basis weight larger than a predetermined value is higher than the contact pressure for a medium having a basis weight lower than the predetermined value.

* * * * *